United States Patent
Golan et al.

(10) Patent No.: US 9,218,669 B1
(45) Date of Patent: Dec. 22, 2015

(54) IMAGE GHOST REMOVAL

(75) Inventors: Oren Golan, Or-Yehuda (IL); Itshak Horovitz, Rishon Lezion (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 160 days.

(21) Appl. No.: 13/352,642

(22) Filed: Jan. 18, 2012

Related U.S. Application Data

(60) Provisional application No. 61/434,701, filed on Jan. 20, 2011.

(51) Int. Cl.
  *G06K 9/00* (2006.01)
  *G06T 7/20* (2006.01)

(52) U.S. Cl.
  CPC ..... *G06T 7/2053* (2013.01); *G06T 2207/20144* (2013.01)

(58) Field of Classification Search
  None
  See application file for complete search history.

(56) References Cited

U.S. PATENT DOCUMENTS

| | | | | |
|---|---|---|---|---|
| 6,570,608 | B1* | 5/2003 | Tserng | 348/143 |
| 7,436,887 | B2* | 10/2008 | Yeredor et al. | 375/240.01 |
| 7,957,592 | B2* | 6/2011 | Huang et al. | 382/173 |
| 2005/0089194 | A1* | 4/2005 | Bell | 382/103 |
| 2007/0195993 | A1* | 8/2007 | Chen et al. | 382/103 |
| 2009/0060278 | A1* | 3/2009 | Hassan-Shafique et al. | 382/103 |
| 2009/0087096 | A1* | 4/2009 | Eaton et al. | 382/190 |
| 2009/0244390 | A1* | 10/2009 | Feris et al. | 348/701 |
| 2010/0290710 | A1* | 11/2010 | Gagvani et al. | 382/224 |
| 2011/0280478 | A1* | 11/2011 | Chen et al. | 382/165 |
| 2012/0162416 | A1* | 6/2012 | Su et al. | 348/143 |
| 2012/0173577 | A1* | 7/2012 | Millar et al. | 707/780 |
| 2012/0183177 | A1* | 7/2012 | Ku et al. | 382/103 |

* cited by examiner

*Primary Examiner* — Li Liu
(74) *Attorney, Agent, or Firm* — Meunier Carlin & Curfman

(57) ABSTRACT

A method for image ghost removal is provided. The method for image ghost removal includes receiving an image and a background model related to the image, and generating a foreground mask based on the image and the background model. The method also includes identifying image ghosts within the foreground mask, and updating the background model to eliminate the image ghosts.

21 Claims, 5 Drawing Sheets

IMAGE GHOST REMOVAL

RELATED APPLICATIONS

This application hereby claims the benefit of and priority to U.S. Provisional Patent Application 61/434,701, titled "IMAGE GHOST REMOVAL", filed on Jan. 20, 2010, which is hereby incorporated by reference in its entirety.

TECHNICAL FIELD

Aspects of the invention are related, in general, to the field of image processing and analysis.

TECHNICAL BACKGROUND

Image analysis involves performing processes on images or video in order to identify and extract meaningful information from the images or video. In many cases, these processes are performed on digital images using digital image processing techniques. Computers are frequently used for performing this analysis because large amounts of data and complex computations may be involved. Many image processing techniques are designed to emulate recognition or identification processes which occur through human visual perception and cognitive processing. Object detection techniques often involve use of a background model of the scene of interest.

Over time background models may become outdated or corrupt. In such a case, elements that properly belong to the background may be improperly flagged as foreground elements requiring analysis. These elements are called ghosts. Oftentimes it is difficult to categorize ghosts as they may initially appear to be actual foreground elements. Ghosts result in wasted computer or user time required to eliminate ghosts from video analysis.

Overview

A method for image ghost removal is provided. The method for image ghost removal includes receiving an image and a background model related to the image, and generating a foreground mask based on the image and the background model. The method also includes identifying image ghosts within the foreground mask, and updating the background model to eliminate the image ghosts.

In another embodiment, a computer system configured for image ghost removal is provided. The computer system includes a memory configured to store images and background models, and a processor coupled to the memory. The processor is configured to receive an image and a background model related to the image, and to generate a foreground mask based on the image and the background model. The processor is also configured to identify image ghosts within the foreground mask, and update the background model to eliminate the image ghosts.

In a further embodiment, a non-transitory computer readable medium having stored thereon program instructions for image ghost removal is provided. When executed by a computer system, the program instructions direct the computer system to receive an image and a background model related to the image, and to generate a foreground mask based on the image and the background model. The program instructions also direct the computer system to identify image ghosts within the foreground mask, and update the background model to eliminate the image ghosts.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
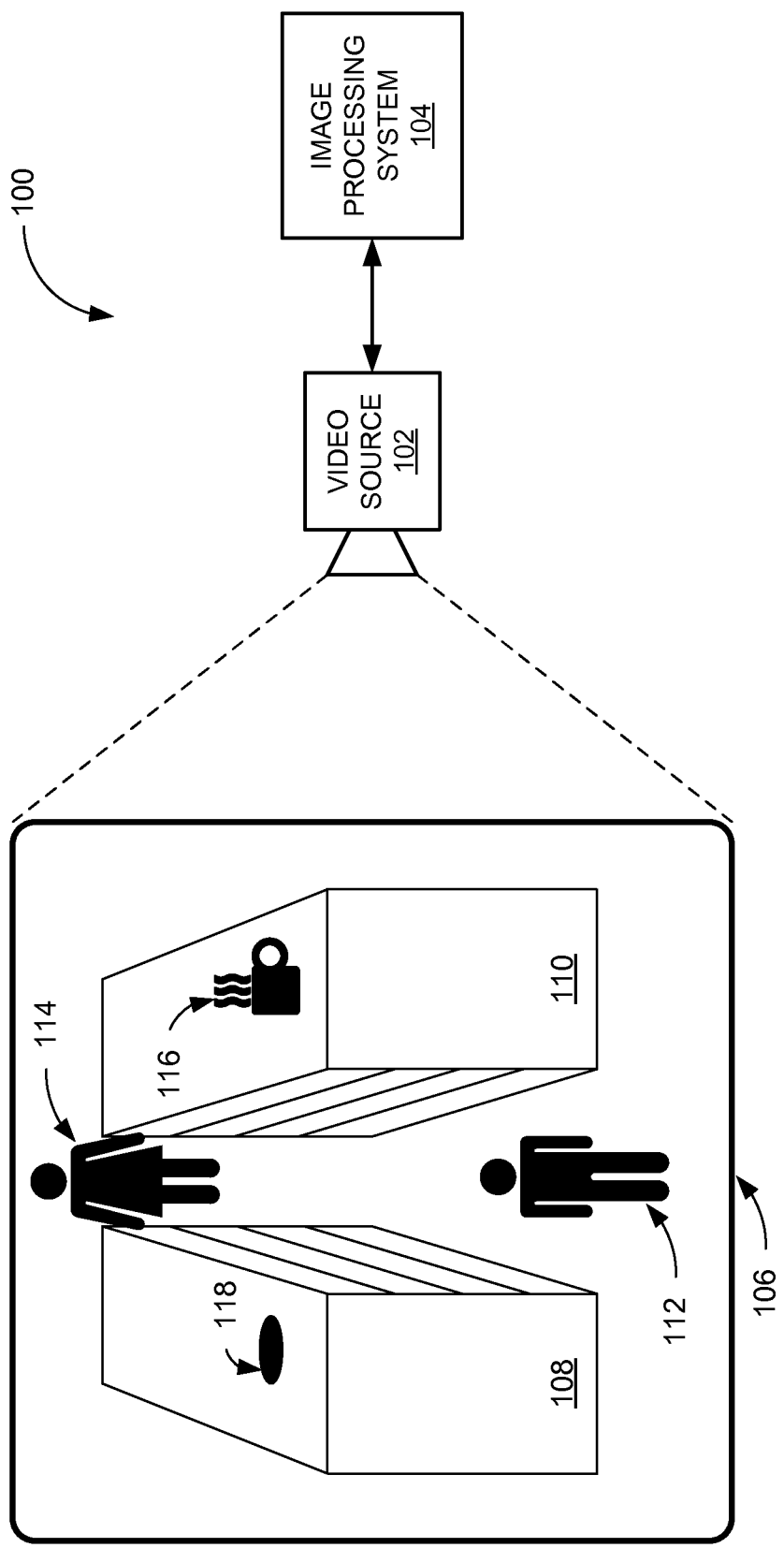
FIG. 1 illustrates an embodiment of an imaging system.

FIG. 1 illustrates imaging system 100. Imaging system 100 comprises video source 102 and image processing system 104. Video source 102 is configured to capture video data of scene 106. In this example, scene 106 includes a plurality of elements. These elements include display 108, display 110, man 112, woman 114, coffee 116, and stain 118 on top of display 108.

Video source 102 may comprise any device having the capability to capture video or images. Video source 102 comprises circuitry and an interface for transmitting video or images. Video source 102 may be a device which performs the initial optical capture of video, may be an intermediate video transfer device, or may be another type of video transmission device. For example, video source 102 may be a video camera, still camera, internet protocol (IP) camera, video switch, video buffer, video server, or other video transmission device, including combinations thereof.

Image processing system 104 may comprise any device for processing or analyzing video, video streams, or images. Image processing system 104 comprises processing circuitry and an interface for receiving video. Image processing system 104 is capable of performing one or more processes on the video streams received from video source 102. The processes performed on the video may include viewing, storing, transforming, mathematical computations, modifications, object identification, analytical processes, conditioning, other processes, or combinations thereof. Image processing system 104 may also comprise additional interfaces for transmitting or receiving video streams, a user interface, memory, software, communication components, a power supply, or structural support. Image processing system 104 may be a video analytics system, server, digital signal processor, computing system, or some other type of processing device, including combinations thereof.

Video source 102 and image processing system 104 communicate via one or more links which may use any of a variety of communication media, such as air, metal, optical fiber, or any other type of signal propagation path, including combinations thereof. The links may use any of a variety of communication protocols, such as internet, telephony, optical networking, wireless communication, wireless fidelity, or any other communication protocols and formats, including combinations thereof. The link between video source 102 and image processing system 104 may be direct as illustrated or may be indirect and accomplished using other networks or intermediate communication devices.

It should be understood that imaging system 100 may contain additional video sources, additional image processing systems, or other devices.

Figure 2:
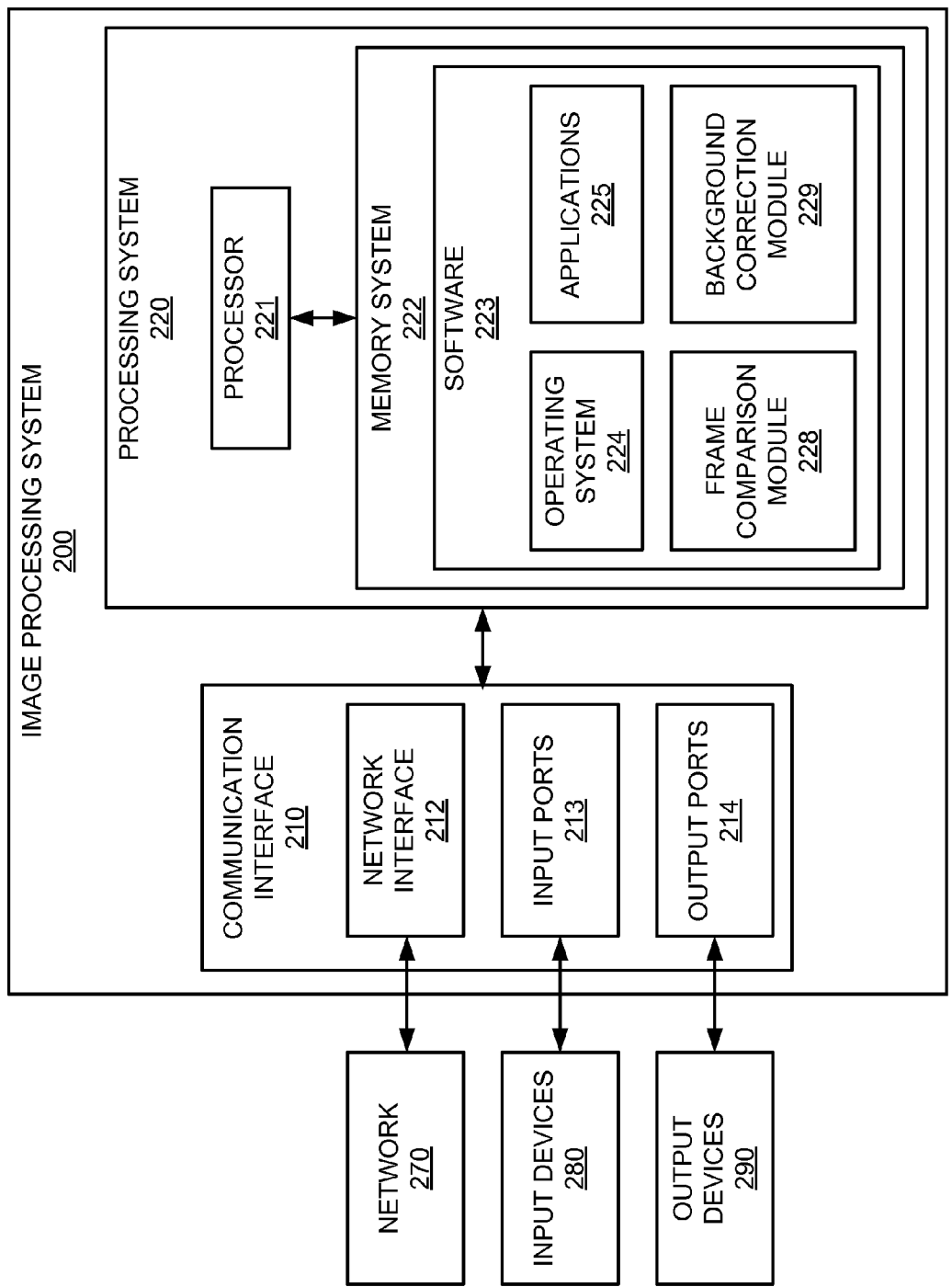
FIG. 2 illustrates an embodiment of an image processing system.

FIG. 2 illustrates image processing system 200. Image processing system 200 includes communication interface 210 and processing system 220. Processing system 220 is linked to communication interface 210 through a communication link.

Communication interface 210 includes network interface 212, input ports 216, and output ports 218. Communication interface 210 includes components that communicate over communication links, such as network cards, ports, RF transceivers, processing circuitry and software, or some other communication device. Communication interface 210 may be configured to communicate over metallic, wireless, or optical links. Communication interface 210 may be configured to use TDM, IP, Ethernet, optical networking, wireless protocols, communication signaling, or some other communication format, including combinations thereof. Image processing system 200 may include multiple network interfaces.

Network interface 212 is configured to connect to external devices over network 270. Network interface 212 may be configured to communicate in a variety of protocols. Input ports 216 are configured to connect to input devices 280 such as a video source, a storage system, a keyboard, a mouse, a user interface, or other input device. Output ports 218 are configured to connect to output devices 290 such as a storage system, other communication links, a display, or other output devices.

Processing system 220 includes processor 221 and memory system 222. Processor 221 includes microprocessor, or other circuitry that retrieves and executes operating software from memory system 222. Memory system 222 comprises software 223. Memory system 222 may be implemented using random access memory, read-only memory, a hard drive, a tape drive, flash memory, optical storage, or other memory apparatus.

Software 223 comprises operating system 224, applications 225, frame comparison module 228, and background correction module 229. Software 223 may also comprise additional computer programs, firmware, or some other form of non-transitory, machine-readable processing instructions. When executed by processor 221, operating system 224 directs processing system 220 to operate image processing system 200 as described herein using applications 222, frame comparison module 228, and background correction module 229. Frame comparison module 228 directs processing system 220 to compare current frames with the background model as described below. Background correction module 229 directs processing system 220 to correct the background model in those pixels where the foreground mask contains an incorrect detection as described below.

Figure 3:
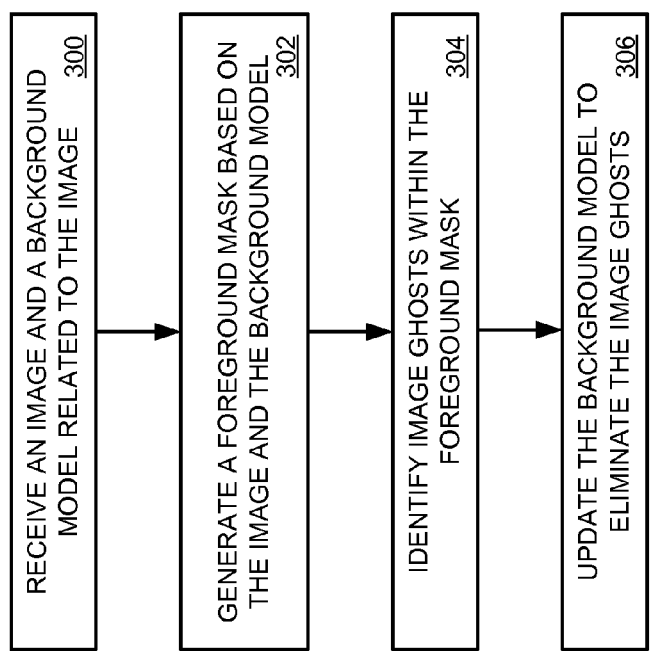
FIG. 3 illustrates a flowchart of an image processing method for image ghost removal.

FIG. 3 illustrates a flowchart of an image processing method for image ghost removal. In this example embodiment of an image processing method for image ghost removal, an image and a background model related to the image are received in image processing system 200, (operation 300). Image processing system 200 generates a foreground mask based on the image and the background model, (operation 302). In the simplest case, this foreground mask may be generated by including all pixels in the image that differ from the background model in the foreground mask.

Image processing system 200 identifies image ghosts within the foreground mask, (operation 304). Image ghosts may be considered image elements within the foreground mask that remain unchanged for a period of time. Image elements within the foreground mask that do not move for a set period of time are then identified as image ghosts. For example, image ghosts may be identified by determining a length of time that each pixel in the foreground mask has been different from a corresponding pixel in the background image, and identifying a pixel as an image ghost pixel when the length of time for that pixel exceeds a criteria.

When image ghosts are identified, image processing system 200 updates the background model to eliminate the image ghosts, (operation 306). This updating may be accomplished by overwriting pixels corresponding to the image ghost in the background model with the corresponding pixels in the image. The updated background model may now be stored in a memory.

At this point, the image ghost may be removed from the foreground. In some embodiments this may be accomplished by clearing those pixels in the foreground mask associated with the image ghost, or by comparing the current image with the updated background mask.

Figure 4:
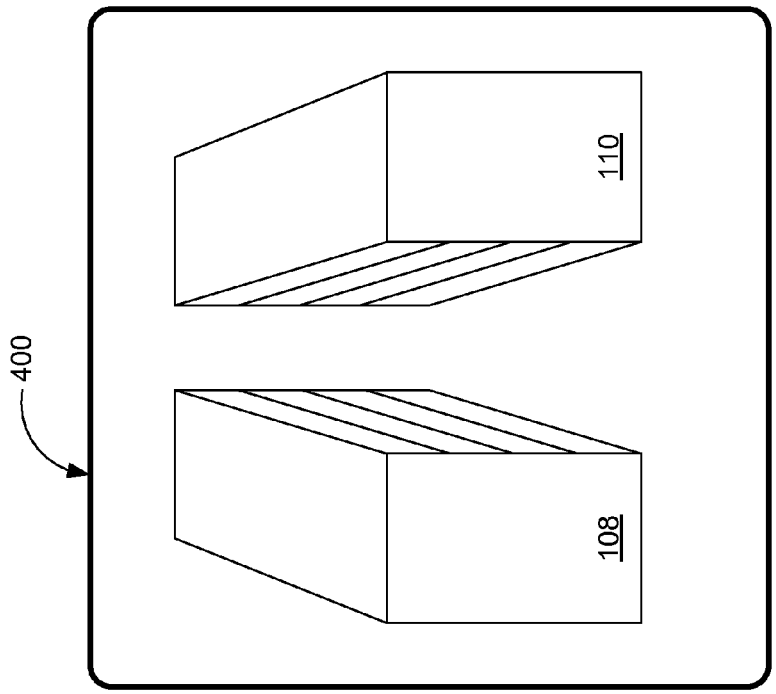
FIG. 4 illustrates an example background model within an embodiment of an image processing system for image ghost removal.

FIG. 4 illustrates an example background model 400 within an embodiment of an image processing system for image ghost removal. The examples illustrated in FIGS. 4 through 8 use scene 106 from FIG. 1 as captured by video source 102 and image processing system 104 as an example current image. This example background model 400 corresponding to scene 106 includes only display 108 and display 110. Any image elements other than these two displays will be considered an image object in the foreground mask for this example.

Figure 5:
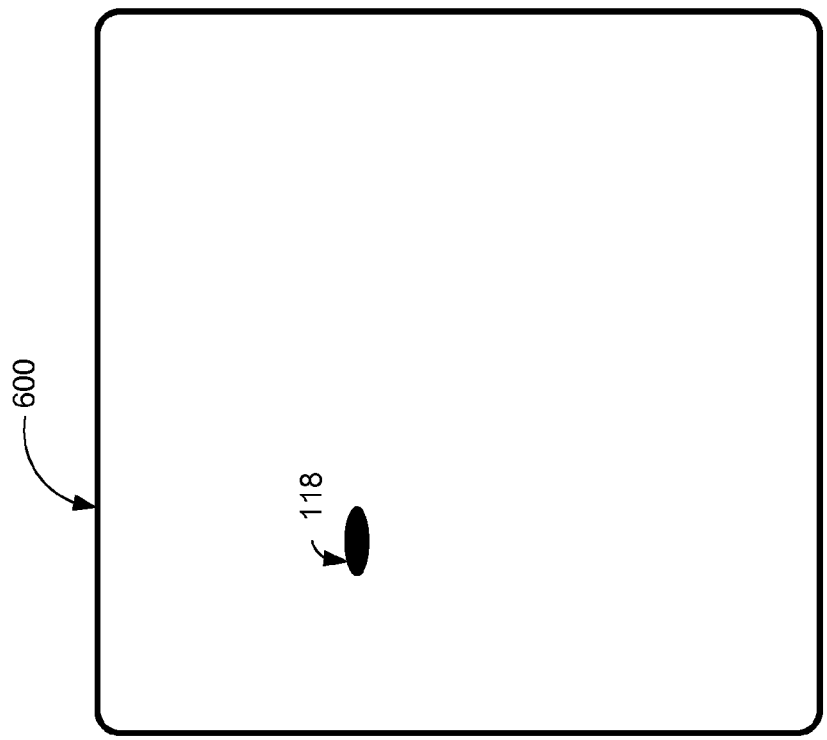
FIG. 5 illustrates an example foreground mask within an embodiment of an image processing system for image ghost removal.

FIG. 5 illustrates an example foreground mask 500 within an embodiment of an image processing system for image ghost removal. This example foreground mask 500 includes all of the image objects found in scene 106 that are not included in background mask 400. In this example, man 112, woman 114, coffee 116, and stain 118 are considered foreground image elements and are included in foreground mask 500.

Figure 6:
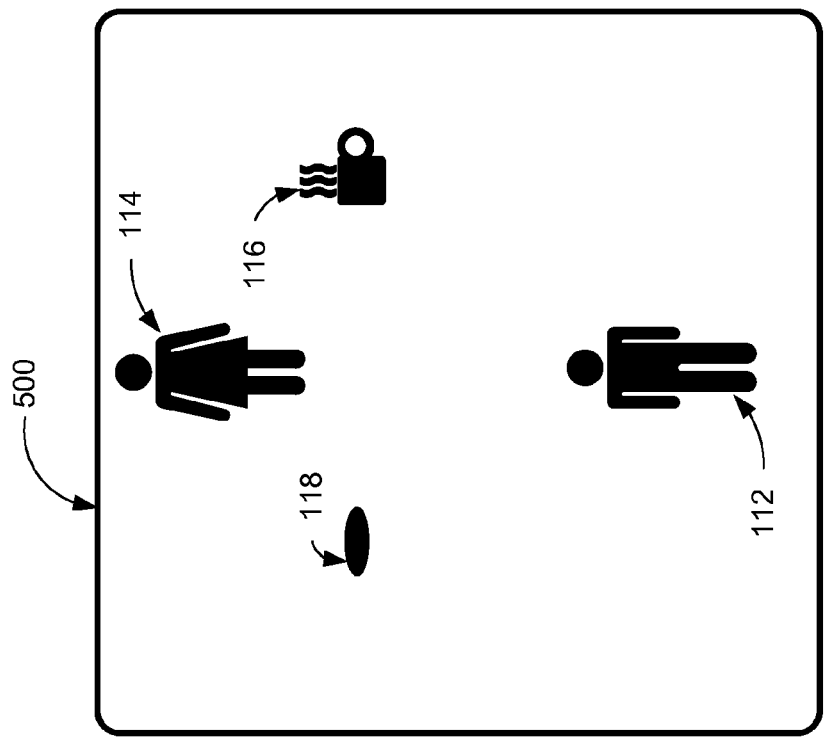
FIG. 6 illustrates an example ghost within an embodiment of an image processing system for image ghost removal.

FIG. 6 illustrates an example ghost 600 within an embodiment of an image processing system for image ghost removal. In this example, stain 118 has remained unchanged for a long period of time exceeding the criteria to count it as an image ghost. Since man 112, woman 114, and coffee 116 from foreground mask 500 have not been stationary long enough to exceed the criteria, they are correctly categorized as foreground elements within foreground mask 500.

Figure 7:
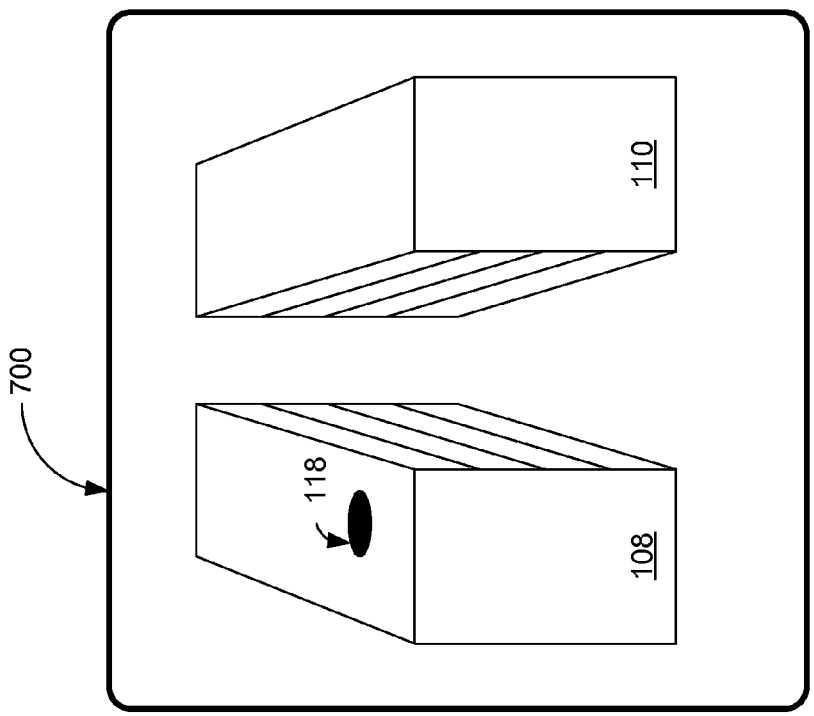
FIG. 7 illustrates an example background model including a ghost within an embodiment of an image processing system for image ghost removal.

FIG. 7 illustrates an example background model including a ghost 700 within an embodiment of an image processing system for image ghost removal. In this example background model 400 has been updated to include the image ghost stain 118 resulting in an updated background model 700.

Figure 8:
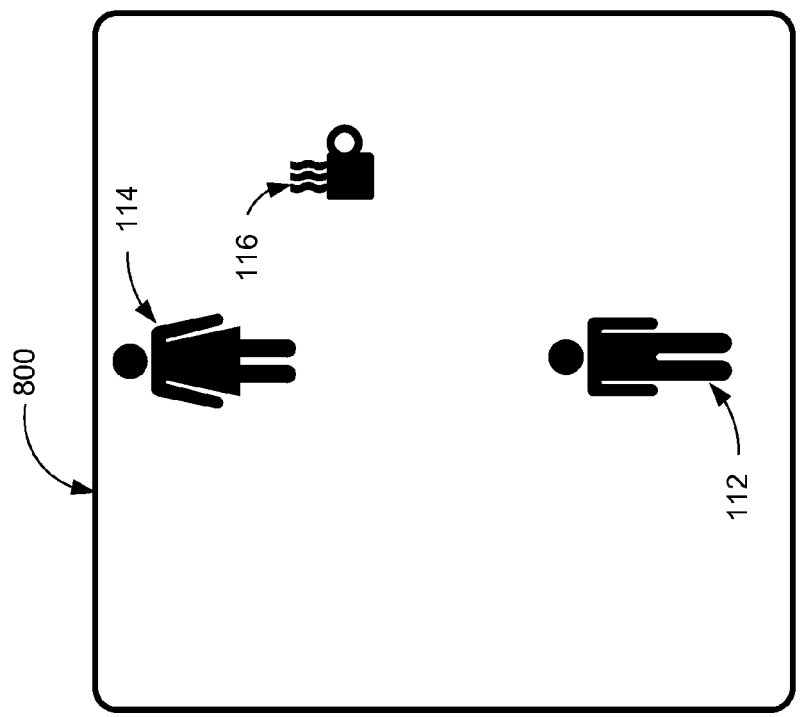
FIG. 8 illustrates an example foreground mask without a ghost within an embodiment of an image processing system for image ghost removal.

FIG. 8 illustrates an example foreground mask without a ghost 800 within an embodiment of an image processing system for image ghost removal. In this example, when updated background model 700 is used to process scene 106, three foreground image elements remain in foreground mask 800: man 112, woman 114, and coffee 116. The elimination of stain 118 as a foreground image element allows for faster processing of the three remaining foreground image elements since no longer is computer or user time wasted on analysis of stain 118.

In one example method for image ghost removal, two computer modules are maintained by the system. Cyclic_Frame_Buffer stores a total of PARAM_BUFFER_SIZE images from the past, each image is recorded PARAM_BUFFER_SPACING seconds from the previous image. Dead_Pixel_Map is an array containing counts for each pixel the number of seconds that it has been continuously flagged as a ghost in the foreground mask. The array is updated every PARAM_DPM_UPDATE_RATE seconds. To save memory, the value saturates (i.e. reaches a maximum value) at 255 seconds.

Every PARAM_WORK_RATE seconds the binary components of the foreground mask are examined. This may be accomplished by examining all of the detected objects in the current frame or by examining all connected components in the foreground mask. Those objects that exist for less than PARAM_OBJ_MIN_AGE seconds are ignored. The binary mask components which are associated with each detected object are then examined.

For each binary mask component, the number of pixels that have been included in the Dead_Pixel_Map longer than PARAM_DPM_MIN_VALUE seconds are counted and their percentage is calculated. Binary mask components that do not reach PARAM_DPM_MIN_COVERAGE percent are skipped.

Also for each binary mask component, the oldest image in the Cyclic_Frame_Buffer is retrieved. The SSD score over the area of the inspected binary mask components between the oldest image and the current image is calculated. Binary mask components whose result exceeds PARAM_SSD_MIN_VALUE are skipped.

Further, for each binary mask component, the binary mask components that have passed the two tests above are declared as still. Any detected objects associated with that binary mask component are disabled and/or killed, and the background model where the binary mask components are located is updated according to the value of the binary mask component in the current image.

Example initial values for the variables in this embodiment are:
PARAM_BUFFER_SIZE=6, PARAM_BUFFER_SPACING=10,
PARAM_DPM_UPDATE_RATE=1, PARAM_WORK_RATE=5,
PARAM_OBJ_MIN_AGE=5, PARAM_DPM_MIN_VALUE=20,
PARAM_DPM_MIN_COVERAGE=80, and PARAM_SSD_MIN_VALUE=15.

The Dead_Pixel_Map array may be built using an exponential decay memory mechanism. In other words, the value stored per each pixel will be "SUM (from k=0 to infinity) over q*IsOn(t−dt*k)", where q can have an example value of 0.8 and IsOn(t) is 1 if the inspected pixel was on at time t and 0 otherwise. dt is a predetermined period of time, such as a second.

In some cases, an element within a scene may initially appear to be static, and thus be improperly flagged as a ghost. To prevent important elements in a scene, such as a person standing still, from improper flagging as a ghost, some embodiments measure an amount of motion within the static region to ensure that the element is not actually a foreground element instead of a ghost. If motion is detected within the static region, the element is identified as a proper element of the foreground mask.

Since mask boundaries are not necessarily consistent with image boundaries, in some embodiments, before the ghost is incorporated into the background model, a gradient is calculated around the border of the ghost within the current image to ensure that the ghost is still relevant and not formed by a temporary change or noise. If the element is actually a ghost, no meaningful gradients should be found. If gradients are found in the current image, it's likely that the element is not a ghost and belongs in the foreground mask.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for image ghost removal comprising:
receiving an image and a first background model related to the image;
generating a foreground mask based only on the image and the first background model;
identifying image ghosts within the foreground mask; and
updating the first background model to eliminate the image ghosts without comparing the image to a second background model, wherein the identifying image ghosts entails a determination of an array of counts for each pixel in the image containing a number of seconds that the pixel has been continuously flagged as part of the ghost image in the foreground mask,
and wherein the identifying image ghosts further entails measuring an amount of motion within the image ghosts to ensure that the image ghosts are not a foreground element.

2. The method of claim 1, wherein identifying image ghosts comprises determining pixels within the foreground mask that contain a background element incorrectly identified as a foreground element.

3. The method of claim 1, wherein generating the foreground mask comprises comparing the image to the first background model and including only pixels that are different from the background model in the foreground mask.

4. The method of claim 3, wherein identifying image ghosts comprises:
determining a length of time that each pixel in the foreground mask has been different from a corresponding pixel in the first background image; and
identifying a pixel as an image ghost pixel when the length of time for that pixel exceeds a criteria.

5. The method of claim 4, wherein updating the first background model comprises overwriting pixels corresponding to the image ghost in the background model with the corresponding pixels in the image.

6. The method of claim 5, further comprising: removing the image ghost from the foreground mask.

7. The method of claim 6, further comprising: storing the updated background model in a memory.

8. A computer system configured for image ghost removal, the computer system comprising:

a memory configured to store images and background models; and a processor coupled to the memory configured to:
  receive an image and a first background model related to the image;
  generate a foreground mask based only on the image and the first background model;
  identify image ghosts within the foreground mask; and
  update the first background model to eliminate the image ghosts without comparing the image to a second background model, wherein the identifying image ghosts entails a determination of an array of counts for each pixel in the image containing a number of seconds that the pixel has been continuously flagged as part of the ghost image in the foreground mask,
  and wherein the identifying image ghosts further entails measuring an amount of motion within the image ghosts to ensure that the image ghosts are not a foreground element.

9. The computer system of claim 8, wherein identifying image ghosts comprises determining pixels within the foreground mask that contain a background element incorrectly identified as a foreground element.

10. The computer system of claim 8, wherein generating the foreground mask comprises comparing the image to the first background model and including only pixels that are different from the first background model in the foreground mask.

11. The computer system of claim 10, wherein identifying image ghosts comprises:
  determining a length of time that each pixel in the foreground mask has been different from a corresponding pixel in the first background image; and
  identifying a pixel as an image ghost pixel when the length of time for that pixel exceeds a criteria.

12. The computer system of claim 11, wherein updating the first background model comprises overwriting pixels corresponding to the image ghost in the first background model with the corresponding pixels in the image.

13. The computer system of claim 12, wherein the processor is further configured to:
  remove the image ghost from the foreground mask.

14. The computer system of claim 13, wherein the processor is further configured to:
  store the updated background model in the memory.

15. A non-transitory computer readable medium having stored thereon program instructions for image ghost removal, that when executed by a computer system, direct the computer system to:

receive an image and a first background model related to the image;
  generate a foreground mask based only on the image and the first background model; identify image ghosts within the foreground mask; and
  update the first background model to eliminate the image ghosts without comparing the image to a second background model
  wherein the identifying image ghosts entails a determination of an array of counts for each pixel in the image containing a number of seconds that the pixel has been continuously flagged as part of the ghost image in the foreground mask,
  and wherein the identifying image ghosts further entails measuring an amount of motion within the image ghost to ensure that the image ghosts are not a foreground element.

16. The non-transitory computer readable medium of claim 15, wherein identifying image ghosts comprises determining pixels within the foreground mask that contain a background element incorrectly identified as a foreground element.

17. The non-transitory computer readable medium of claim 15, wherein generating the foreground mask comprises comparing the image to the first background model and including only pixels that are different from the first background model in the foreground mask.

18. The non-transitory computer readable medium of claim 17, wherein identifying image ghosts comprises:
  determining a length of time that each pixel in the foreground mask has been different from a corresponding pixel in the first background image; and
  identifying a pixel as an image ghost pixel when the length of time for that pixel exceeds a criteria.

19. The non-transitory computer readable medium of claim 18, wherein updating the first background model comprises overwriting pixels corresponding to the image ghost in the background model with the corresponding pixels in the image.

20. The non-transitory computer readable medium of claim 19, wherein the instructions further direct the computer system to:
  remove the image ghost from the foreground mask.

21. The non-transitory computer readable medium of claim 20, wherein the instructions further direct the computer system to:
  store the updated background model in the memory.

* * * * *